US009450957B1

(12) United States Patent
Daniel (10) Patent No.: US 9,450,957 B1
(45) Date of Patent: Sep. 20, 2016

(54) INTERACTIVE MAIL VERIFICATION SYSTEM AND METHOD

(71) Applicant: Isaac S. Daniel, Miramar, FL (US)

(72) Inventor: Isaac S. Daniel, Miramar, FL (US)

(*) Notice: Subject to any disclaimer, the term of this patent is extended or adjusted under 35 U.S.C. 154(b) by 30 days.

(21) Appl. No.: 14/465,282

(22) Filed: Aug. 21, 2014

Related U.S. Application Data (60) Provisional application No. 61/868,663, filed on Aug. 22, 2013.

(51) Int. Cl.
| | | |
|---|---|---|
| H04L 12/58 | (2006.01) | |
| H04L 29/06 | (2006.01) | |
| G06F 3/0481 | (2013.01) | |
| G06F 3/0486 | (2013.01) | |

(52) U.S. Cl.
CPC ......... *H04L 63/0861* (2013.01); *G06F 3/0486* (2013.01); *G06F 3/04817* (2013.01); *H04L 51/04* (2013.01)

(58) Field of Classification Search
CPC ............... H04L 63/0861; H04L 51/04; G06F 3/04817; G06F 3/0486; G06F 3/04842; G06F 17/30011; H04M 1/72552
See application file for complete search history.

(56) References Cited

U.S. PATENT DOCUMENTS

| | | | | |
|---|---|---|---|---|
| 7,567,657 B2* | 7/2009 | Foxenland | ........... | G06Q 10/107 379/142.01 |
| 2001/0032246 A1* | 10/2001 | Fardella | ................ | H04L 29/06 709/206 |
| 2002/0083022 A1* | 6/2002 | Algazi | ............. | G07B 17/00508 705/408 |
| 2003/0070072 A1* | 4/2003 | Nassiri | ...................... | H04L 9/32 713/168 |
| 2003/0195935 A1* | 10/2003 | Leeper | .................... | G06F 21/32 709/206 |
| 2006/0105744 A1* | 5/2006 | Frank | ..................... | G06F 21/33 455/411 |
| 2009/0276702 A1* | 11/2009 | Bamford | ............... | G06F 3/0488 715/702 |
| 2010/0011304 A1* | 1/2010 | van Os | ............... | G06F 3/04817 715/762 |
| 2010/0262928 A1* | 10/2010 | Abbott | ............... | G06F 3/04817 715/769 |
| 2011/0164058 A1* | 7/2011 | Lemay | .................. | G06F 3/0488 345/651 |
| 2012/0218196 A1* | 8/2012 | Lv | ......................... | G06F 3/0416 345/173 |
| 2013/0174065 A1* | 7/2013 | Dayan | .................... | G06F 3/048 715/763 |
| 2013/0268828 A1* | 10/2013 | Bucchieri | ............. | G06Q 50/01 715/205 |
| 2014/0282888 A1* | 9/2014 | Brooksby | ......... | H04M 3/42391 726/4 |

\* cited by examiner

*Primary Examiner* — Catherine Thiaw
(74) *Attorney, Agent, or Firm* — Carol N. Green Kaul, Esq.

(57) ABSTRACT

The present disclosure relates generally to electronic systems and methods, and more particularly, to systems, methods, and various other disclosures related to an interactive mail verification system and method for sending and receiving electronic communications, i.e. electronic mails, as well as posts or messages from social network contacts, in a manner that allows the recipient to verify the identity of the sender prior to reviewing the electronic communications, by viewing an image with embedded interactive icons in a border that correspond to functional control commands for controlling the review of the electronic message or updating of contacts, when the icons are activated.

18 Claims, 12 Drawing Sheets

302 — Displaying On A Display Device When Activated By A User Input Device, An Image For A Contact Within A Border That Includes At Least One Embedded Icon, Whereby Upon Activation The At Least One Embedded Icon Becomes Visible And May Be Engaged For Controlling The Review Of An Electronic Message Or Updating Contacts Pursuant To A Control Command Associated With The At Least One Icon.

304 — Allowing A User To Use The User Input Device To Control The Reviewing Of The Electronic Message By Selecting The At Least One Icon, By Dragging And Releasing The At Least One Icon In An Activation Area In An Email Application.

306 — Verifying Recipient's Identity With Biometric Verification Means Using At Least One Biometric Identifier If Biometric Verification Is Required For Access To The Electronic Message And Using The Biometric Identifier To Provide The Recipient With Access To The Electronic Message.

INTERACTIVE MAIL VERIFICATION SYSTEM AND METHOD

PRIORITY CLAIM

This patent application is a Non-Provisional patent application and claims priority under 35 U.S.C. 119(e) to U.S. Provisional Patent Application Ser. No. 61/868,663, titled "Interactive Mail Verification System And Method," filed Aug. 22, 2013. The entire disclosure of the afore-mentioned patent application is incorporated by reference as if fully stated herein.

FIELD OF THE INVENTION

The present disclosure relates generally to electronic systems and methods, and more particularly, to systems, methods, and various other disclosures related to an interactive mail verification system and method for sending and receiving electronic communications, i.e. electronic mails, as well as posts or messages from social network contacts, in a manner that allows the recipient to verify the identity of the sender prior to reviewing the electronic communications, by viewing an image with embedded interactive icons in a border that correspond to functional control commands for controlling the review of the electronic message or updating of contacts, when the icons are activated.

BACKGROUND OF THE INVENTION

Most communications are transmitted electronically by email. However, many search engines and other applications engage in data mining, crawling and saving cookies derived from the emails. Therefore, a sender can never be absolutely sure that the email transmitted was never reviewed, by another. Further, the law has not yet imposed sanctions and limitations for such offenses to data privacy. Thus it would be helpful to be able to be certain that an email was transmitted to the intended sender without any unauthorized viewing, such that any unauthorized viewing, data mining, tampering, crawling or other unauthorized review can be criminally or civilly sanctioned.

Yet another issue that users face these days is with e-mail privacy. Federal laws prohibit accessing or otherwise tampering with electronic communications, however once those communications have been stored for over 180 days, the prohibition no longer applies, and thus, employees of e-mail service providers can access users' emails thereby violating their privacy. Furthermore, many people disregard the Federal laws altogether and access user e-mails without consent. Many users also do not want e-mail service providers data mining the contents of their e-mails, which service providers sometimes use to provide customized ads.

The system and methods described herein satisfies these long felt needs in a new and novel manner.

SUMMARY OF THE INVENTION

The following system and methods result from the realizations that composing, sending, and receiving both physical and electronic correspondence may be made more efficient and easier by providing various embodiments of systems, methods for the convenient and secure composition, transmission, and receipt of electronic and physical messages, including e-mail, documents, audio and video messages, wherein the recipient has the ability to review the identity of the sender prior to opening the electronic message.

BRIEF DESCRIPTION OF THE DRAWINGS

Further objectives and advantages of the present invention may be derived by referring to the detailed description and claims when considered in connection with the Figures, wherein like reference numbers refer to similar items throughout the Figures.

DETAILED DESCRIPTION OF PREFERRED EMBODIMENTS

The following discussion describes in detail an embodiment of the various methods as described below. However, this discussion should not be construed, as limiting the invention to those particular embodiments, as practitioners skilled in the art will appreciate that an apparatus and system may vary as to configuration and as to details of the parts, and that a method may vary as to the specific steps and sequence, without departing from the basic concepts as disclosed herein. Similarly, the elements described herein may be implemented separately, or in various combinations without departing from the teachings of the present invention. Turning now descriptively to the drawings, in which similar reference characters denote similar elements throughout the several views.

Figure 1A:
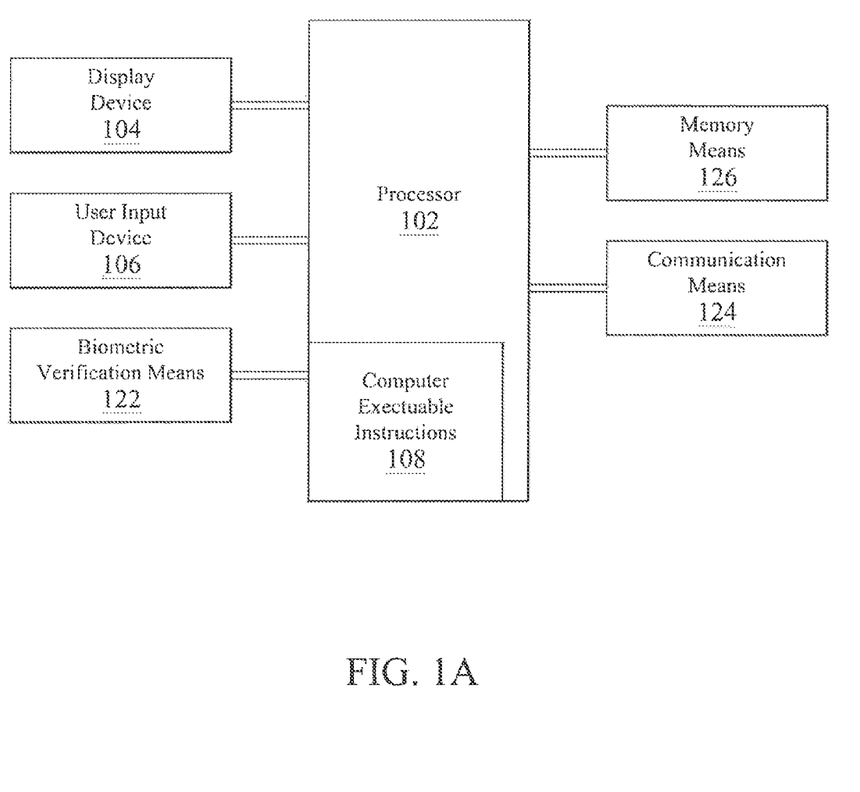
FIG. 1A shows a block diagram depicting a system in accordance with one embodiment.

FIG. 1A shows a block diagram depicting a system 100 in accordance with one embodiment of the invention. System 100 comprises of a computer processor 102; a display device 104 electronically connected to the computer processor 102; a user input device 106 connected to the computer processor 102; and computer executable instructions 108 executable by the computer processor 102 and configured for causing the computer processor 102 to launch an electronic mail ("e-mail") application 110 programmed for: displaying when activated by the user input device 106, an image 112 for a contact within a border 114 that includes at least one embedded icon 116, whereby upon activation the at least one embedded icon 116 becomes visible and may be engaged for controlling the review of an electronic message 118 or updating contacts pursuant to a control command associated with the at least one icon 116; and allowing a recipient to use the user input device 106 to control the reviewing of the electronic message 118 by selecting the at least one icon 116, dragging and releasing the at least one icon 116, in an activation area 120; and biometric verification means 122 for verifying recipient's identity using at least one biometric identifier if biometric verification is required for access to the electronic message 116 and using the biometric identifier to provide the recipient with access to the electronic message 116. Wherein reviewing of the electronic message 118 includes but is not limited to: reading, declining to read the electronic message 118; saving the electronic message 118; or opening an attachment within the image 112 of the at least one contact, playing a video, stopping a video, fast-forwarding a video, rewinding a video, pausing a video, maximizing a video, minimizing a video, and cancelling the review of a video and the like.

System 100 further comprises of communications means 124 electronically connected to the processor 102, operative to transmit the recipient's biometric identifier to the sender where the biometric identifier may be stored on the future sender's server and/or the recipient's display device 114 in the event biometric verification is required for the review of the electronic message 116; or to transmit the electronic messages 116 to and from the sender and one or more recipients.

Computer processor 102 may comprise any type of processor 102 including, but not limited to, a central processing unit (CPU), a microprocessor, a video processor, a front end processor, a coprocessor, a single-core central processor, a multi-core processor, and the like. Processor 102 may be programmed to activate the e-mail application 110 to intercept incoming electronic messages 118 that have been transmitted using the system 100 and method so that the message may be processed according to the methods disclosed herein.

In some embodiments, embedded within the computer processor 102 are computer executable instructions 108, readable and executable by the computer processor 102 where the computer executable instructions 108 are operative to perform the varied system and methods disclosed herein including but not limited to: launching the e-mail application 110 programmed for controlling the reviewing of electronic messages 118 and updating of contacts; displaying when activated by the user input device 106, an image 112 for a contact within a border 114 that includes at least one embedded icon 116, whereby upon activation the at least one embedded icon 116 becomes visible and may be engaged for controlling the review of an electronic message 118 or updating contacts pursuant to a control command associated with the at least one icon 116; and allowing a recipient to use the user input device 106 to control the reviewing of the electronic message 118 by selecting the at least one icon 116, dragging and releasing the at least one icon 116 in an activation area 120; applying an electronic postmark to the electronic message 118, wherein the electronic postmark comprises an identifier associated with a biometric identifier of the recipient, wherein the identifier is configured to be used by an authorized recipient e-mail application 110 to verify the identity of the recipient and authorize access to the electronic message 118 and wherein the identifier triggers an authorized recipient's e-mail application 110 to request a biometric identifier, as well as the varied other functions discussed herein.

Figure 1B:
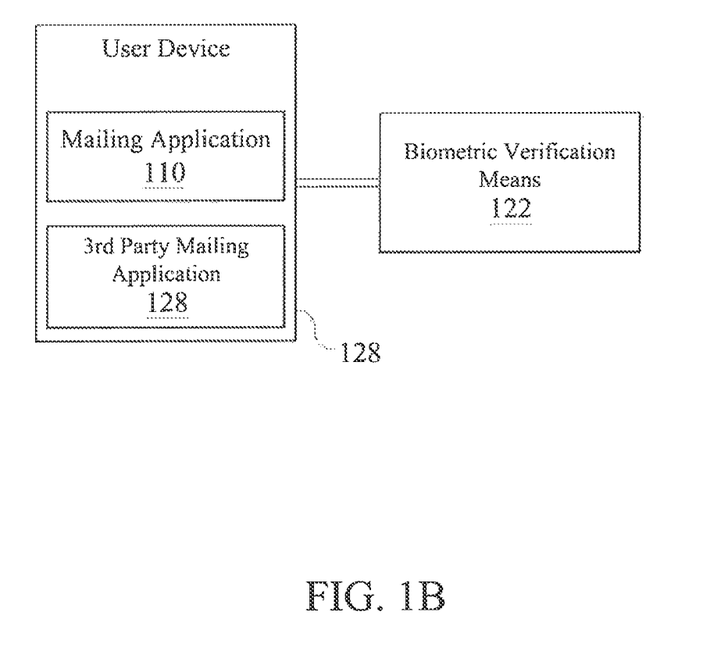
FIG. 1B shows a block diagram depicting a user device in accordance with one embodiment.

Computer executable instructions 108 may be loaded directly on the computer processor 102, or may be stored in the user device's memory means 126. Memory means 126 includes but is not limited to, non-transitory computer readable media, such as, but not limited to, a hard drive, a solid state drive, a flash memory, random access memory, CD-ROM, CD-R, CD-RW, DVD-ROM, DVD-R, DVD-RW, and the like, or read and write memory, such as a hard drive, floppy disc, CD-RW, DVD-RW, solid state memory, such as solid state hard drives, flash cards, memory chips, and the like, and random access memory. Computer executable instructions 108 may be any type of computer executable instructions 108, which may be in the form of a computer program, the program being composed in any suitable programming language or source code, such as C++, C, JAVA, JavaScript, HTML, XML, and other programming languages. In one embodiment, the memory means 126 may comprise of both hardware and software components.

User device 128 comprises of any electronic computerized networked communication device 136 configured with means for communicating wirelessly and/or wired with other electronic computerized network enabled devices, and includes but is not limited to, a cellular phones (e.g., an iPhone, Android, Palm, Blackberry, or any "smart phone" as are generally known and used in the arts), location-aware portable phones (such as GPS), a personal computer, server computer, or laptop or netbook computer, a personal digital assistant ("PDA") such as a Palm-based device or Windows CE device, a laptop computer, a tablet personal computer, a portable screen, a portable processing device and/or any other portable device capable of communicating wirelessly over a computer network, local area network, wide area network, such as the Internet, or any other type of network communication device that may communicate over a network.

User device 128 may include various other hardware components, e.g. memory means 126, one or more communication means 124 and also software components like the e-mail application program 110. The user device's central processor 102 may be programmed to activate the e-mail application program 110, e g running in background while the user device 128 is powered on, for reviewing the electronic messages 118, which may be displayed on a display device 104. In some embodiments, both the recipient user device 128 and the sender's user device 128 may be required to have the same or at least compatible software application.

Display device 104 may comprise any type of display device 1004, such as an LED or LCD screen. In some embodiments, the system 100 uses the display device 104 to display functionality options to a recipient may comprise using a user interface to display functionality options. In some embodiments, logging into a user account may comprise any of the various embodiments described herein throughout the present disclosure.

User input device 106 may comprise of any type of user input device 106, such as a touch screen, a button, a keypad, a gesture control device, and the like. In some embodiments, user input device 106 may be configured with biometric verification means 122, and used to provide the biometric sample for biometric verification if needed, as well as for selecting the various icons 116, 116' for controlling the electronic messages 118, 118' displayed on the display device 114. System 100 may further comprise allowing a recipient to use the user input device 114 to select one or more of the visible (activated) icons 116, 116' to control the viewing of electronic messages 118, 118' an/or the updating of contacts based on the selected icon that has a corresponding control command associated with the icon 116. The functional options associated with the control commands for the icons 116, 116' may comprise any of the various embodiments described herein throughout the present disclosure. Transmitting the electronic message 116, document, or digital document to a recipient may comprise any of the various embodiments described herein throughout the present disclosure, including those various embodiments that incorporate secure transmitting mechanisms and modules, which may include the usage of encryption and biometric verification.

Biometric verification means 122 may include the at least one processor 102 disposed in communication with, for example, any type of biometric reader, such as a fingerprint/palm print reader/scanner, hand geometry scanner, a palm geometry scanner, eye/iris scanner, retina scanner, a camera 106; or a software, e.g. user interface for reading the biometric sample, and/or may include an audio receiving circuit capable of receiving audio signals at predetermined frequencies and/or with additional hardware complete with electronic circuitry for speech recognition. The biometric verification means' at least one processor 102', which may include computer executable instructions 108 operative to perform biometric analysis, such as image recognition and comparison, and the like by processing at least one biometric sample, e.g. validating a biometric sample with the stored biometric identifier for an identical match.

In some embodiments, the computer executable instructions 112 may be configured to use biometric verification means 108 that may include a camera to capture an image of the recipient that may be used to verify the recipient's identity, where on occasions may be required to gain access to the electronic message 118 mailed to his/her email account. E-mail account may comprise, but is not limited to, an account with a third-party e-mail provider, wherein the third-party e-mail provider may comprise, but is not limited to, a web-based third party e-mail provider, an Exchange based third party e-mail provider, and the like. The camera may comprise any type of camera 106, such as a security camera, an infrared camera, a traditional camera, a 3D camera, and the like.

In some embodiments, the biometric verification means 122 includes a software program, where the recipient may physically place his/her finger over a designated area where the software is designed to read recipient's biometric sample for verification with the stored biometric identifier. Once the biometric sample is validated the electronic message 118 is displayed. In some embodiments, the electronic message 118 is a direct message from a social networking site, e.g. FACEBOOK® or TWITTER®, nonetheless, it will be displayed as an e-mail.

In some embodiments of the system 100, the communications means 124 may comprise any type of communications device, such as, but not limited to, a wireless communications device, including a wireless local area network ("WLAN") module, a GSM module, a LTE module, and the like, wherein the communications means 110 may be operative to connect, wirelessly or non-wirelessly, to a local or wide area communications network, such as the Internet. The biometric identifier, date, time, and or the electronic messages 118, 118' may be transmitted by using the communications means 124. In some embodiments, the various communications mentioned above may be achieved through using a computer network, such as a local area network, or a wide area network, such as a world wide web. Accordingly, the various computer program modules may be connected to each other directly or via a computer network.

In some embodiments, the system 100 may comprise a non-transitory computer readable medium reading device, wherein the computer readable medium reading device is electronically coupled to the processor 102, which may comprise any of the various embodiments described herein throughout the present disclosure, such as a flash storage reader, a CD-ROM drive, and the like. In some embodiments, accessing user documents or electronic messages 118, 118' may comprise allowing a user to log-into an account, and then use the communications means 124 to access user documents on a computer readable medium, such as a local or portable computer readable medium, or on a remote server.

Referring now to FIG. 1B, which shows a block diagram of the user device 128 of the system 100 in accordance with one embodiment of the invention. System 100 disclosed herein includes an electronic e-mail application (VOISC™) 110 that operates as an attachment to a third party electronic mail application 110, e.g. MICROSOFT OUTLOOK™, THUNDERBIRD™, APPLE MAIL™, and the like, wherein a recipient has the option of previewing the identity of the sender of an electronic message 118 being transmitted, to be received and displayed on a user device 128, such as a PC, mobile device, tablet, or any other electronic device. In some embodiments, the electronic message 118 may comprise of an e-mail, an instant message, SMS text, message/post from a social network, an attachment to an e-mail, and the like.

In some embodiments, the computer executable instructions 108 may comprise an e-mail application 110, such as, but not limited to, a downloadable e-mail application 110. The e-mail application 128 may be operative to allow the user to connect to a third party e-mail application 110 or account therewith, and retrieve or send messages using the third party e-mail application 110. The e-mail application 110 may be similar in function to popular third-party e-mail applications 128, 128' such as MICROSOFT OUTLOOK™, THUNDERBIRD™, APPLE MAIL™, and the like. In yet another embodiment, the computer executable instructions 108 may comprise a plug-in to existing third-party e-mail applications 128, 128', such as those named above. In essence, the computer executable instructions 108 may "piggy-back" or work in connection with an existing e-mail applications 128, 128'.

E-mail application 110 as referenced herein comprises of a software program with computer executable instructions 108 that are configured to allow the user to use the user input device 108 to control the reviewing of contacts, e.g. adding or declining to update contacts by selecting at least one icon 116 from the plurality of icons 116, 116' associated with the updating function, or reviewing of electronic messages 118, 118', by dragging and releasing the appropriate icon 116 for the chosen function into an activation area 120.

In some embodiments, recipient may have a pre-recorded biometric identifier associated with the recipient's identity and/or user account, which may be may be collected from recipient and stored locally on the sender's or the recipient's user device 128, or remotely, such as on a server or remote database. In yet another embodiment, if a recipient does not yet have a biometric identifier in the system 100, a request may be sent to the recipient to submit a biometric identifier before the electronic message 118 is delivered (so identity can be verified at the time of delivery), or at the time of delivery, so identity can be verified in future communications. Once collected, the recipient's biometric identifier may be stored either locally in a user input device 106, or in a server or database, for future use. Further, a sender may be required to submit their biometric identifier so that their biometric identifier can be used in future situations when a sender becomes a recipient.

In another embodiment, biometric identifier may comprise of any type of biometric identifier, such as a capture or recording of a fingerprint, a voice, a face, and iris, and the like. Accordingly, biometric identifier may be stored in digital form. Biometric identifier as used herein describes a biometric sample obtained from the recipient or sender that uniquely identifies the user based on his/her intrinsic physical traits, e.g. fingerprints, retina scan, palm geometry, hand geometry, speech, and or other biometric identifiers that are used in the arts.

In some embodiments, prior to the recipient gaining access to some electronic messages 118, 118', the system 100 may require a biometric sample 130 to be validated against the recipient's stored biometric identifier prior to the recipient. Recipient may provide his or her biometric sample using the user input device 106 that may include biometric verification means 122, which include but is not limited to: fingerprint recognition means, hand geometry recognition means, palm geometry recognition means, iris recognition means, retina recognition means, speech recognition means and any other biometric reader 108 that are known and used in the arts. In some embodiments, the biometric verification means 122 is a standalone device that is electronically connected to the user device 128. If the biometric sample fails to match the biometric identifier, e.g. recipient may be able to make a second or third attempt at validation or continue to do so until the predetermined number of tries have been exhausted. If further attempts still fail, the recipient will not be able to review the electronic message 118. However, if the biometric sample 130 is verified, recipient will be able to view the electronic message 118 and control the review of the electronic message 118 by using the activated embedded icons 116, 116' that became visible upon activation, which are associated with a control function commands.

Figure 2A:
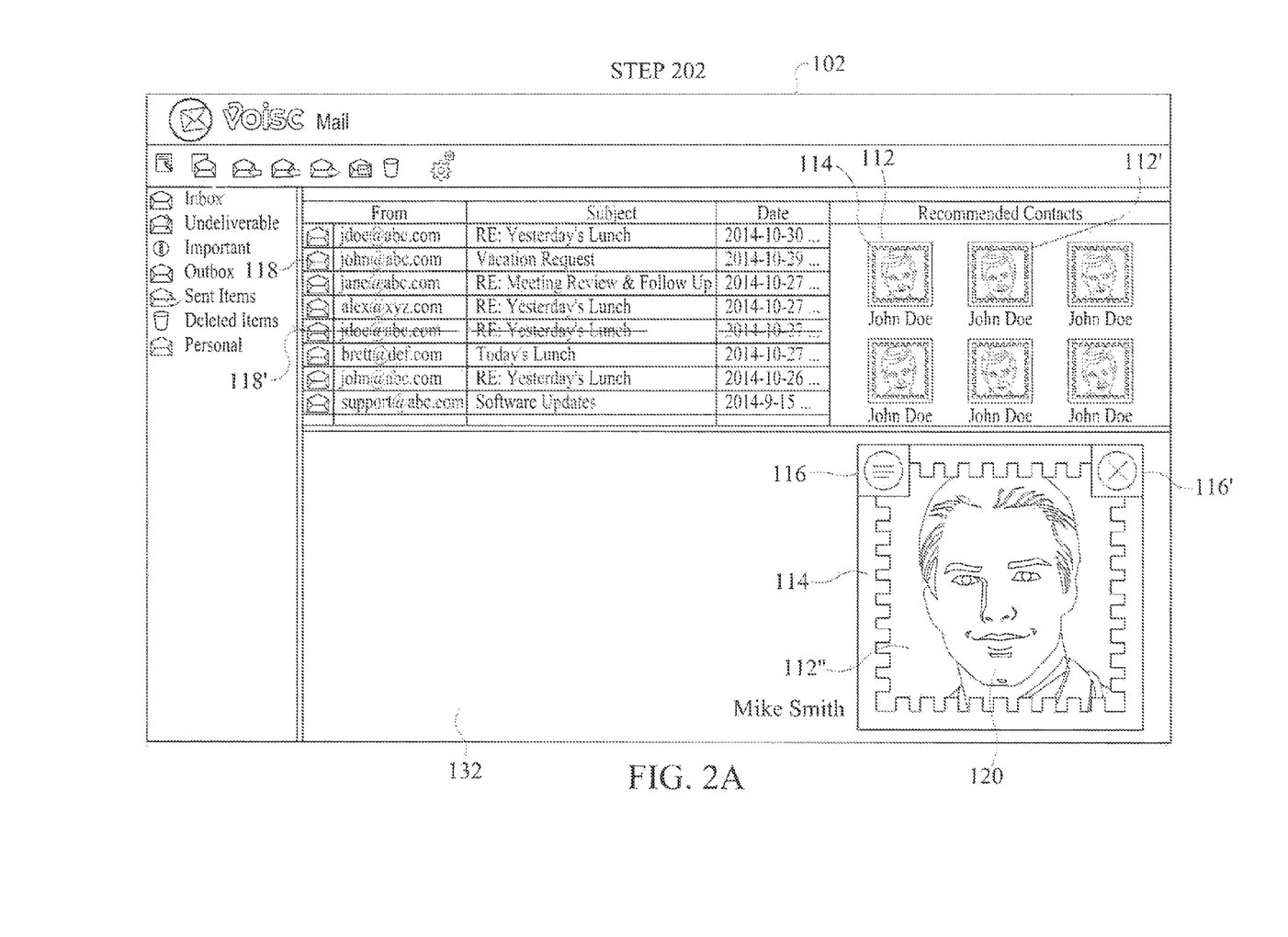
FIGS. 2A-2G show various steps of a method in accordance with one embodiment.

Referring now to FIGS. 2A-2G, which show exemplary steps of method 200 of the invention. In some embodiments, the email (VOISC) application 110 is an add-on to a third-party e-mail application 128, e.g. OUTLOOK®, and is accessible via a clickable icon 116" (not shown). As shown in FIG. 2A, in some embodiments, the e-mail application 110 presents recipient with images 112, 112' of recommended users of the system 200 to add as contacts (step 202) based on his/her preferences, hobbies, other contact's recommendations, and/or other selective criteria. The recommended contacts may be pulled from different social networks and email accounts, e.g. FACEBOOK®, TWITTER®, YAHOO® MAIL, OUTLOOK®, cell phone contacts and the like, that the user has synched to his/her account with the e-mail application 110.

As shown in step 202 of FIG. 2A, once the electronic message 118 is clicked for review using the user's input device 110, the e-mail application 110 reveals the sender's image (or avatar, collectively referred to herein as "image") 112 surrounded by a border 114 within the reading pane 132 prior to revealing the contents of the electronic message 118. By revealing the image 112 in the reading pane 132, the message recipient is provided with additional information to determine whether or not the electronic message 118 is from a known contact and is better able to decide whether to review the electronic message 118 or decline to do so. The image 112 is displayed with the activated interactive icons 116, 116' for controlling the electronic message 118 and/or any attachments transmitted with the electronic message 118.

Figure 2B:
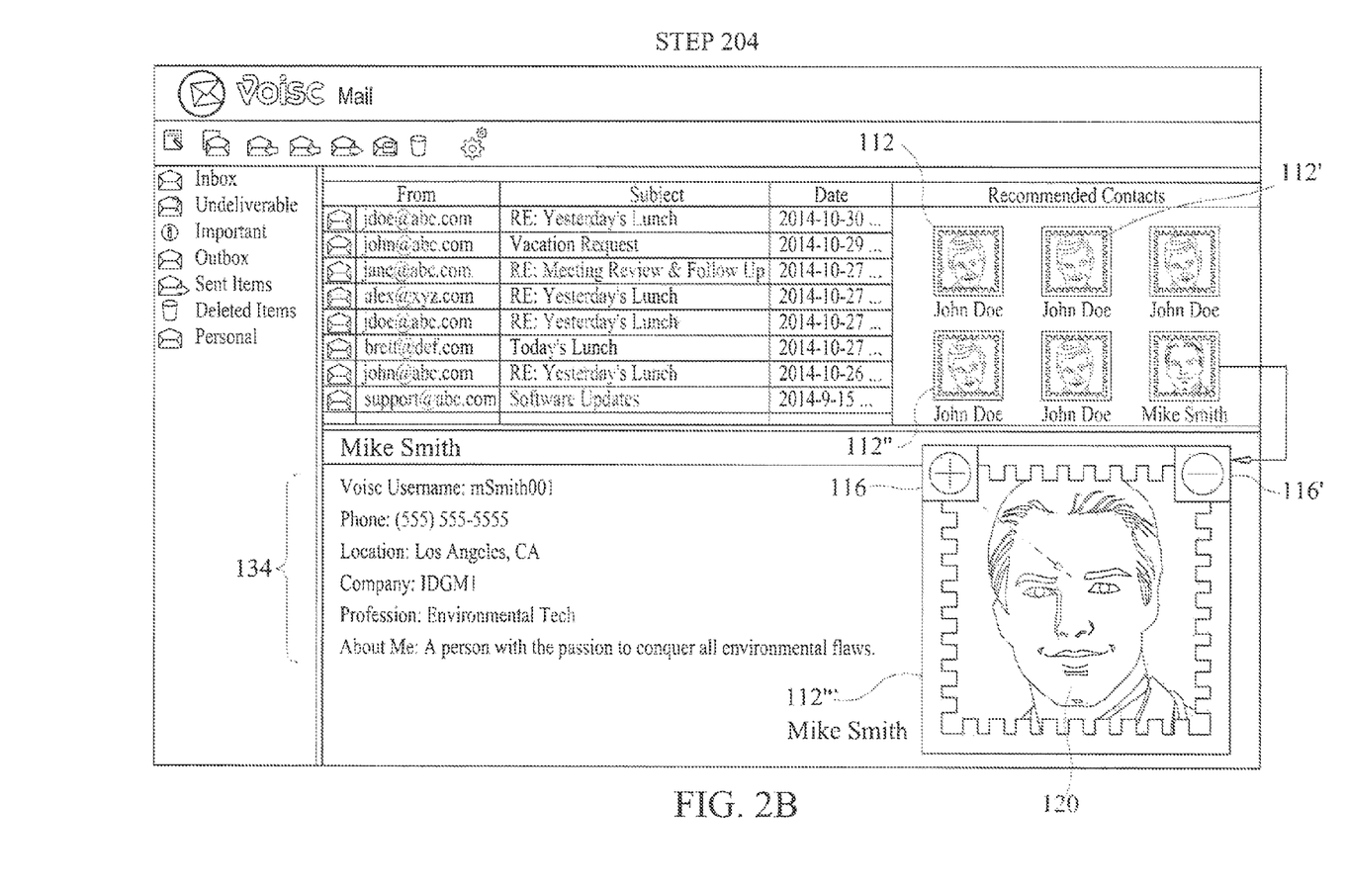

FIG. 2B, step 204, shows an exemplary step of a method 200 of the invention. In an exemplary embodiment as shown, if user selects an image 112 from a plurality of images 112", 112'" of recommended contacts using the user input device 106, the e-mail application 110 activates the previously un-displayed embedded icons 116, 116' within the image 112 and displays the icons 116, 116' as well as displays the sender's contact information for the individual represented by the image 112 (step 204). Depending on where the contact is being pulled from, all relevant contact information 134 is displayed, e.g. username, email address, location, company, profession, education, and other personal information. As shown, the icon 116 may comprise of instructive functional commands, for example in the exemplary embodiment, the icon 116 is shown as a "+" for adding the contact or a "−" for declining to add the contact to recipient's contact list. It is understood that the icons 116, 116' may be any representative image and may be customized to convey its functionality for the recipient's ease of reference. By recipient dragging the appropriate icon 116 to the activation area 120 and releasing the same, the e-mail application 110 receives and performs the appropriate functional command, i.e. the contacts are either updated or remain status quo because of user declined to add new contact to his/her contact list.

Figure 2C:
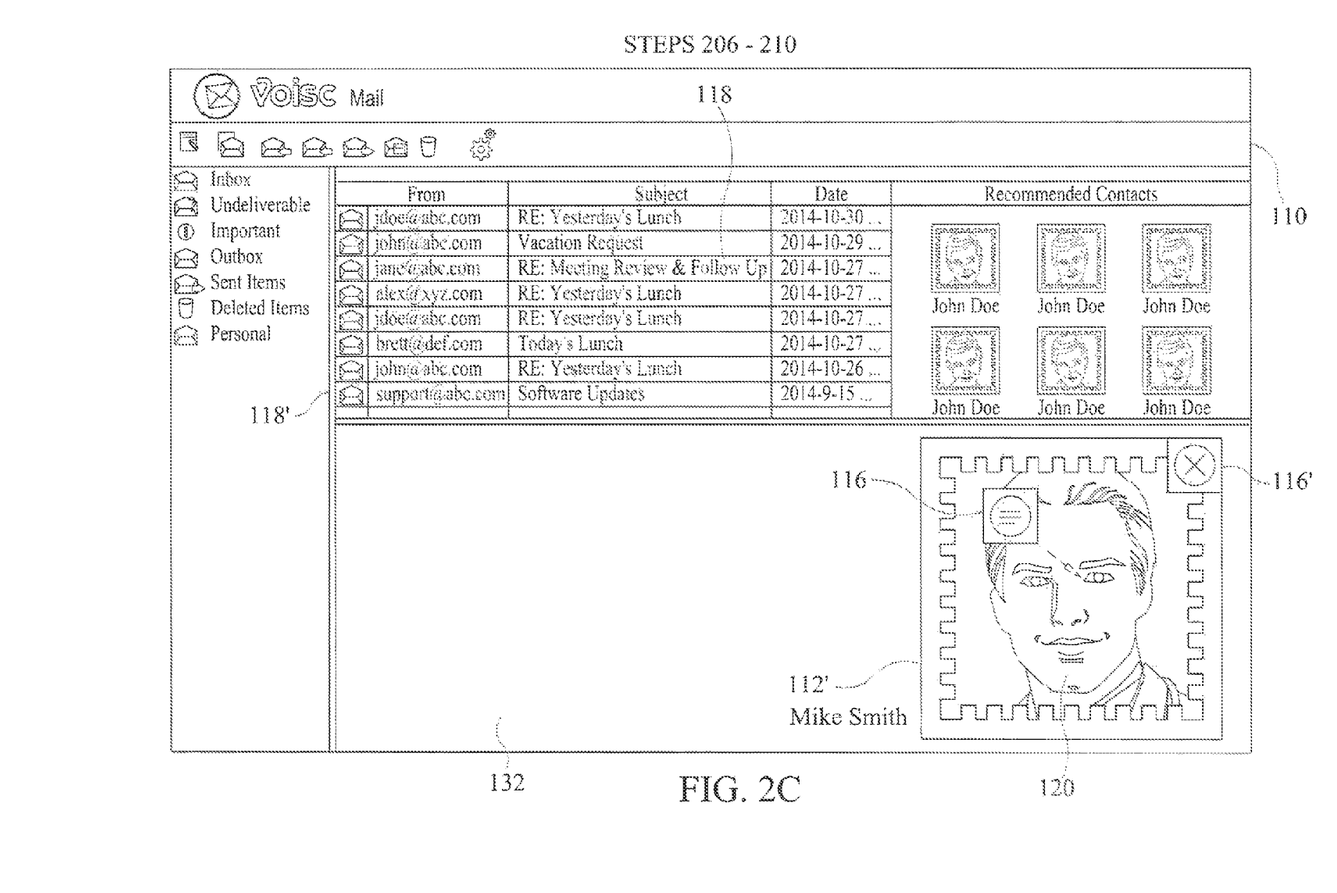

FIG. 2C, steps 206-210, show exemplary steps of method 200 of the invention. In some embodiments, a recipient may receive one or a plurality of electronic messages 118, 118' from known and/or unknown senders where the e-mail application 110 allows the recipient to verify the sender's identity prior to reviewing the electronic message 118. In this manner, if the sender is unknown, the recipient may decline to review the electronic message 118. As shown in step 206, the e-mail application 110 identifies all incoming unread electronic messages 118, 118' from which the recipient may select any one or more electronic messages 118, 118' for display in a reading pane 132. Prior to the contents of the electronic messages 118 being displayed in full or preview format, the sender's identity may be verified to determine, for example, whether or not the user wants to read or decline to read the electronic message 118. By selecting the electronic messages 118 with a user input device 116, the e-mail application 110 activates the embedded icons 116, 116' within the image 112 and they become visibly displayable as well as the contact information for the individual represented by the image 112 (step 204). User now has the opportunity to preview the sender's identity and determine whether or not he/she wants to read the electronic message 112 using the displayed icons 116, 116.

The image 112 is displayed with its border 114 within the reading pane 132 and the previously un-displayed, embedded icons 116, 116' are activated, causing the visible display of a plurality of icons 116, 116' along the border 114 of an image 112 of the at least one contact received from a contact list, plurality of social networks or from the third party email application 104 on the user device's 110 display means, wherein each icon 116 is associated with an updating or reviewing function for the contacts or electronic message 118, respectively. By clicking the activation icon 116", the user can activate the VOISC application 110 to open and review his/her electronic message 118 with or without attachments and/or video files. In some embodiments, the VOISC™ electronic messages 118, 118' are organized and displayable separate and apart from other general electronic messages 118", 118'". In other embodiments, the VOISC™ messages 106, 106' are organized and displayed with other electronic message 118", 118'" from a third party electronic mail application 128.

Upon display of the activated icons 116, 116' within the image 112 within the border 114, the electronic message 118 can be controlled using the icons 116, 116' that have interactive command functionality, by dragging the icon 116 for the chosen function to the activation area 120 that may be located anywhere on the image 112 itself and/or the border 114 of the image 112. Accordingly, method 200 comprises of the e-mail application 110 receiving the control command associated with the now viewable icon 116 and performing the associated function therewith (step 206). For example, if the recipient chooses to decline to review the email, recipient may drag the "X" icon 116', representative of the corresponding command for declining to read the electronic message 118 to the activation area 120. E-mail application 110 will correspondingly close the electronic message 118 without further action (step 208). Alternatively, if user wishes to review the electronic message 118, user may drag the revealed icon 116 (previously embedded within the image 112) for the corresponding review command to the activation area 120 and e-mail application 110 will display the contents of the electronic message 118 (step 210).

Figure 2D:
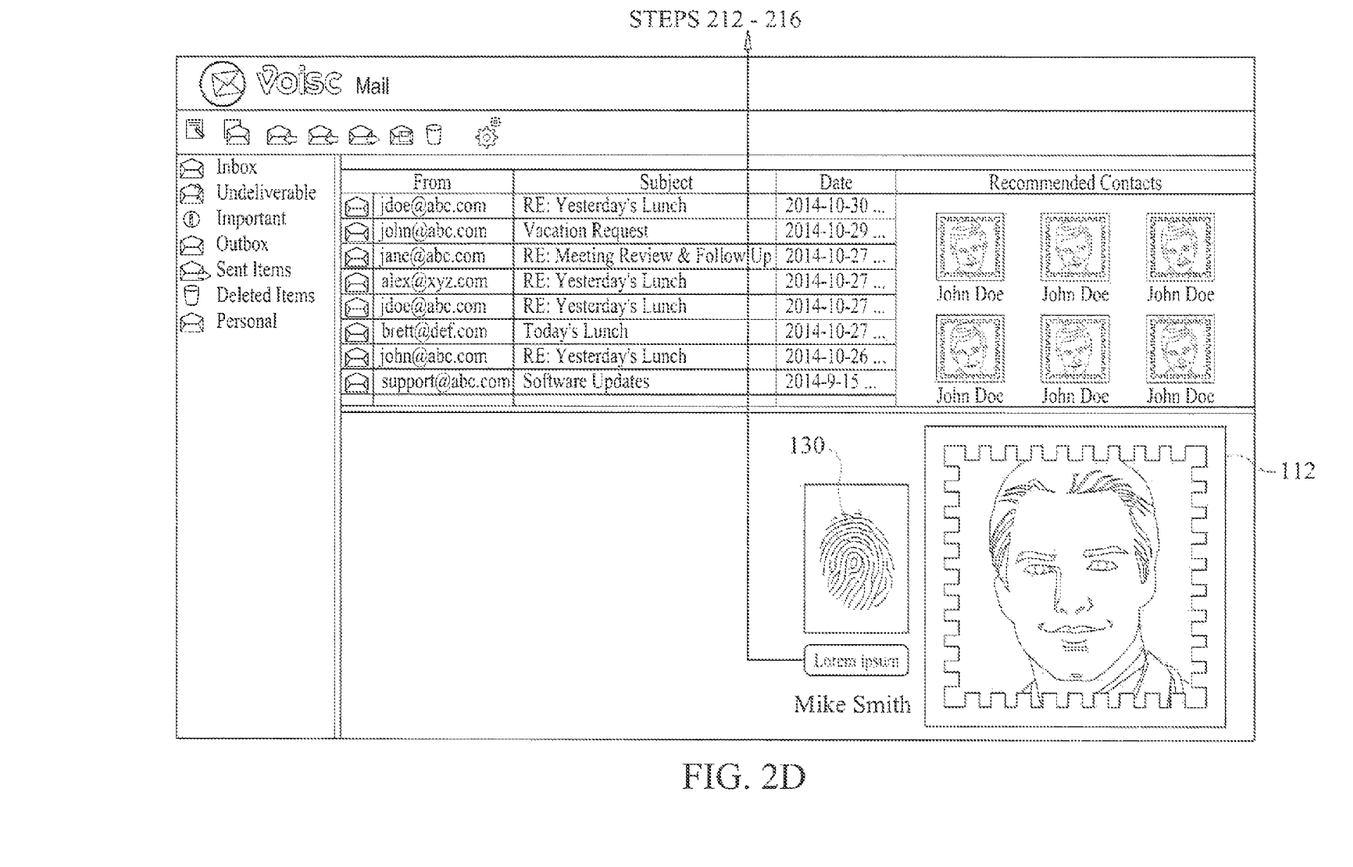

FIG. 2D, steps 212-216, show exemplary steps of method 200 of the invention. In some embodiments, the sender will require recipient to verify his/her identity prior to the electronic message 118 being opened for review. Accordingly, when the recipient selects the icon 116 for review, if biometric verification is required, e-mail application 110 will prompt the recipient to provide his/her biometric sample 130 for verification (step 212) with the stored biometric identifier, for which the e-mail application 110 verifies the identity of the recipient using at least one biometric identifier (step 214) and uses the biometric identifier to provide the at least one recipient with access to the electronic message 118 (step 216) as shown in FIG. 2D.

Figure 2E:
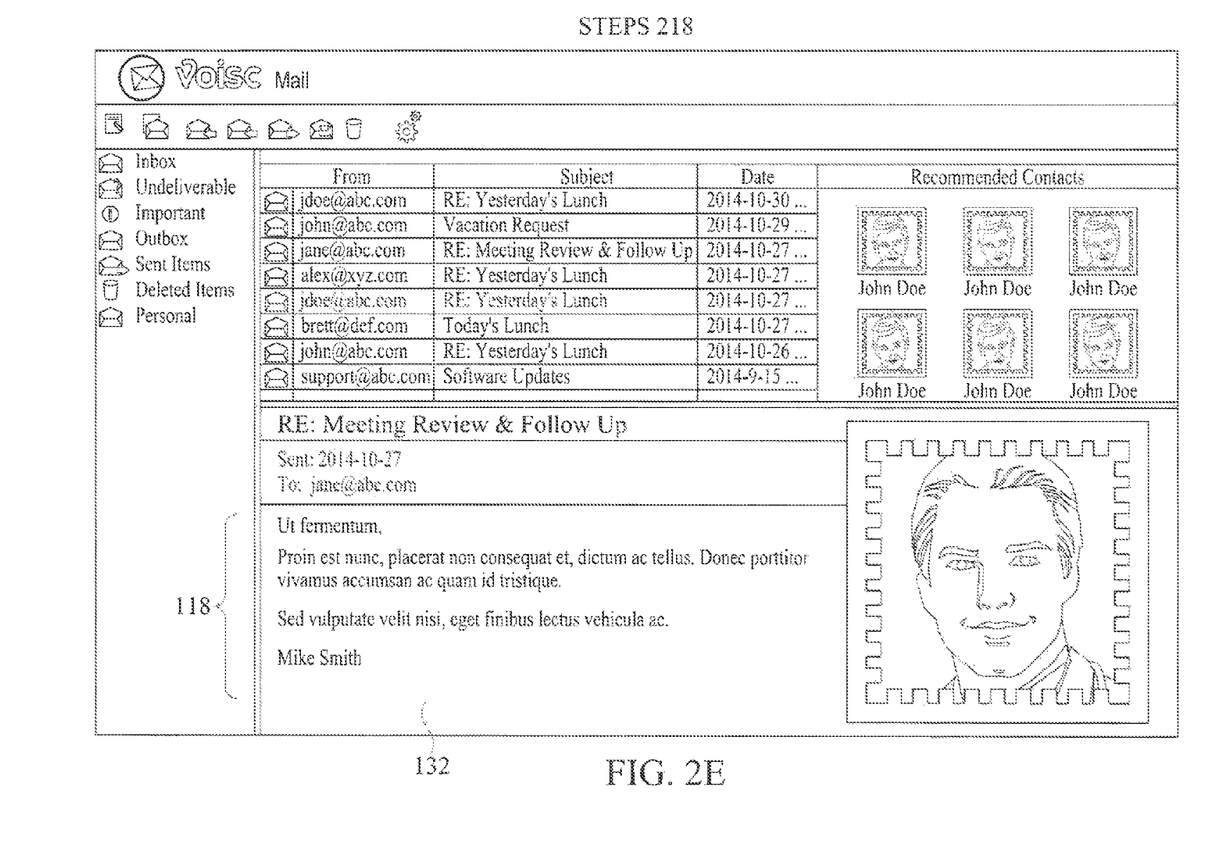

As shown in FIG. 2E, step 218, upon verification, method 200 comprises the e-mail application 110 displaying the contents of the electronic message 118 on the display device 104 (step 218). Accordingly, with the verification process intact, the sender of the electronic message 118 can be assured that the privacy remained intact during the transmission process, whereby no data mining, crawling or farming for cookies and the like occurred.

Figure 2F:
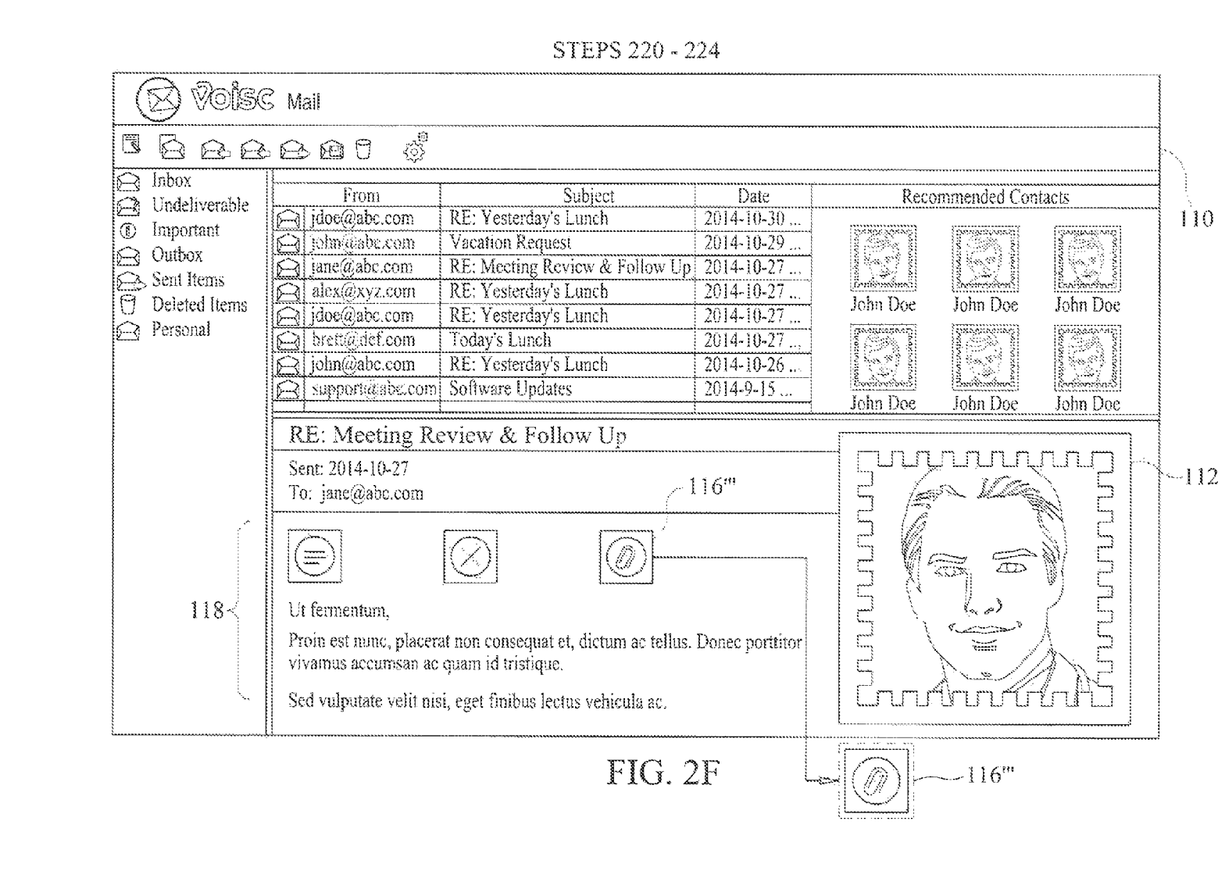
Figures 2G, 2G:
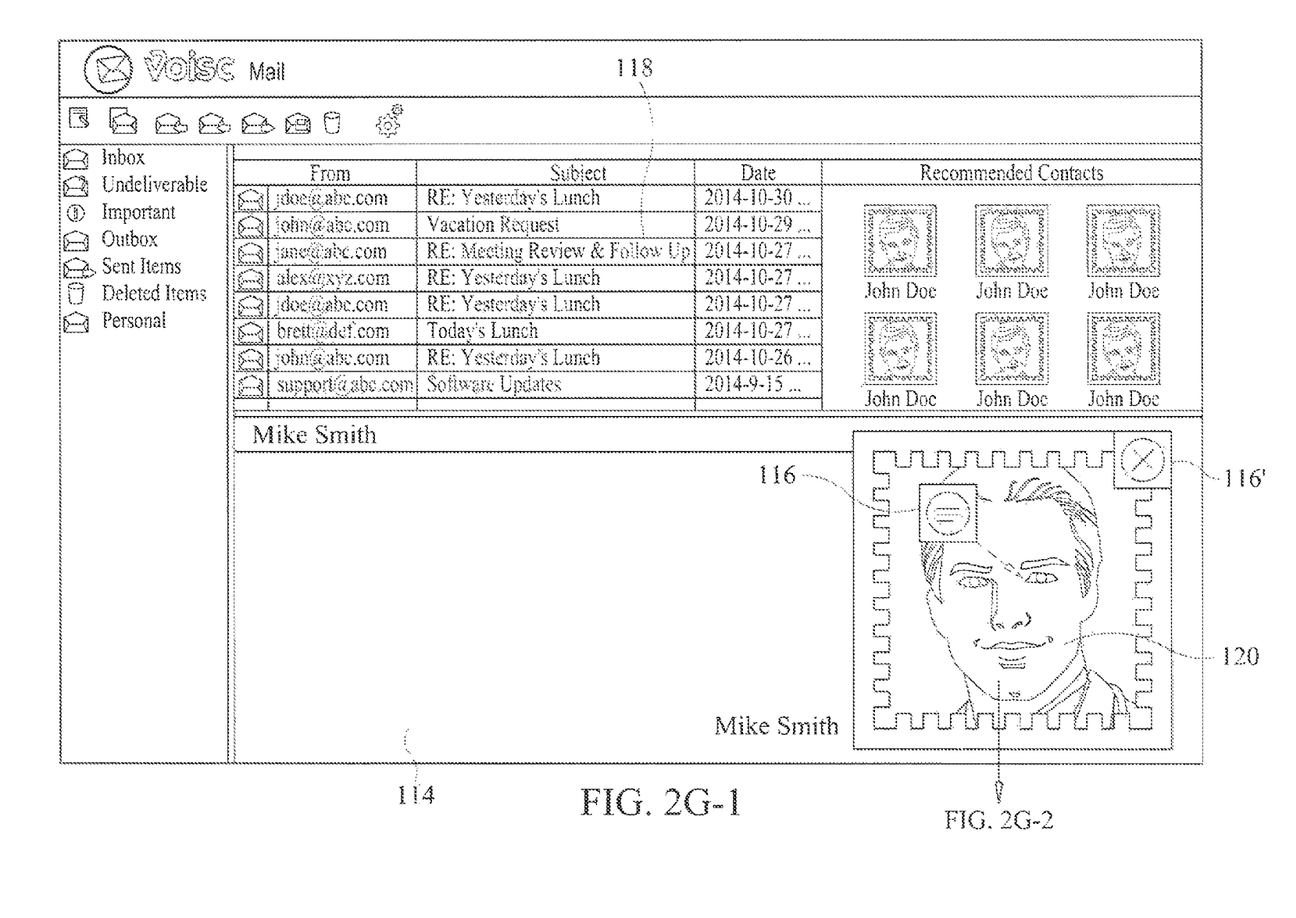
Figure 2G:
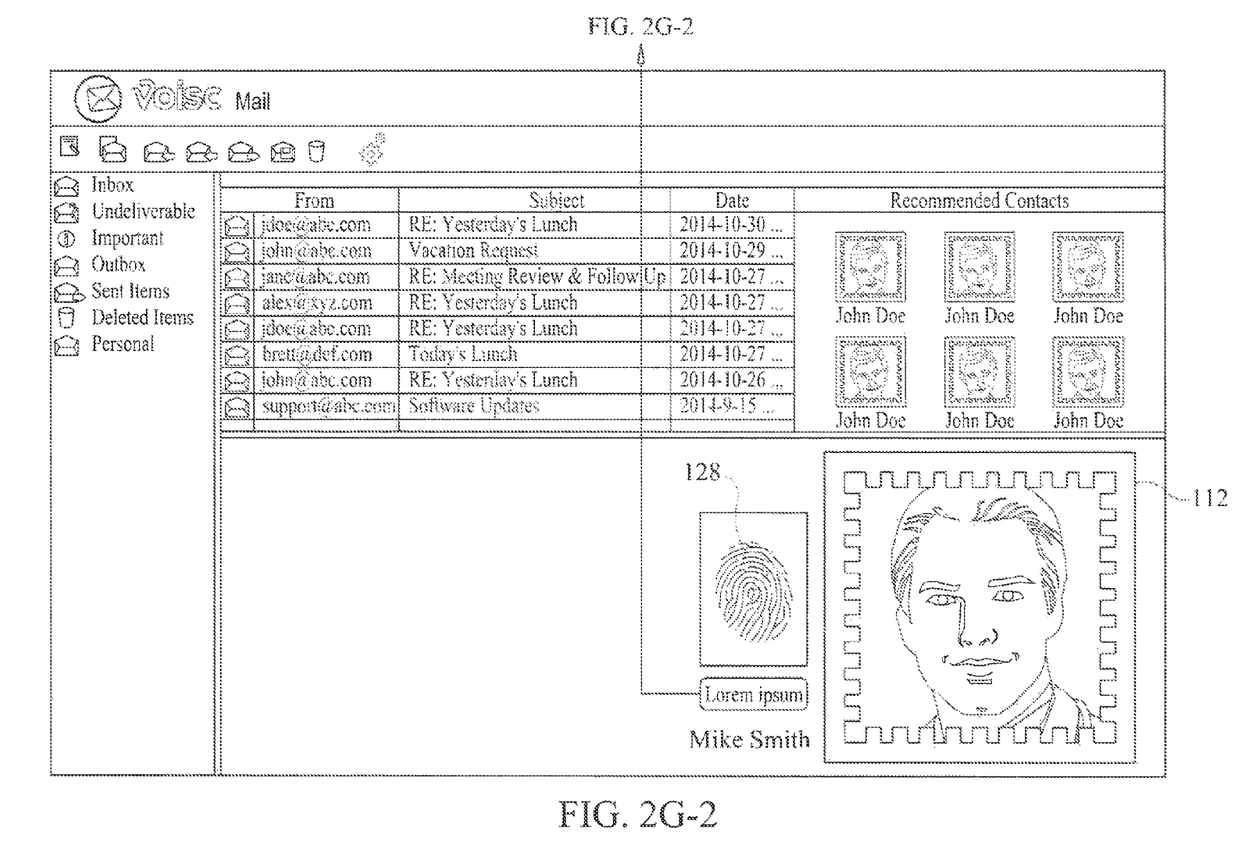

FIG. 2F, steps 220-224, shows exemplary steps of a method 200 of the invention. In some embodiments, the electronic message 118 includes an attachment, for which recipient will need to go through steps 202-210, unless there is a requirement for verification of recipient's identity which will require the additional steps of steps 212-216. In either embodiment, if the electronic message 118 includes an attachment, user may engage the icon 116''' for controlling the attachment (opening, saving, or deleting) by dragging the attachment icon 116''' to the activation area 120 into the sender's image 112, wherein method 200 comprises the e-mail application 110 which will prompt the recipient as to where to save document (step 222), and will open the document within the e-mail application 110 (step 224) so as to not have to leave the e-mail application (VOISC™) 110. The document/image from saved attachment) is essentially part of the body of the electronic message 118. If the file type is not supported by VOISC™, it will be opened in a different window of its native program, if applicable.

In another embodiment, the computer executable instructions may be configured to encrypt the electronic message 118, wherein said encryption may comprise any type of encryption, such as, but not limited to 128-bit, 256-bit, and the like.

In some embodiments of the system 100 and methods 200 disclosed herein, the sender is not charged for the service, where the cost may be dependent on the security clearance for review (i.e. requiring biometric verification) and/or the size of the electronic message 118 being transmitted, e.g. the larger electronic message 118 costing more than the regular size.

In some embodiments, the electronic message 118 arrives at the recipient's email provider in an encrypted format for which the recipient will need the electronic e-mail application 110 to decrypt the received electronic message 118 in order to read and review the same. In this manner in the event that the recipient does not have the electronic e-mail application 110, he/she will be unable to read the encrypted electronic message 118 that has been encrypted by military standards, e.g. up to AES 256 bit encryption.

FIG. 2G, steps 226-228, shows exemplary steps of method 200 of the invention. In some embodiments, the electronic message 118 contains a video message with or without any kind of attached documents. may be required to undergo the verification process as previously described in conjunction steps 202-216 with biometric verification of his/her identity if necessary. All incoming electronic messages 118 are displayed as e-mails, regardless of their original source. i.e., if the message is a direct message from Facebook/Twitter, the message is displayed as an email. If message is an actual email, the email is displayed as intended.

The electronic message 118 is activated for viewing when the electronic message 118 is clicked and the image 112 is revealed in the reading pane 132. The email application 110 is further configured for automatically presenting an appropriate icon 116 for display when activated, for a corresponding functional command for controlling the electronic message 118. The appropriate icon for display is determined based on any one or more of the following: attachment, no attachment, or type of attachment for the electronic message 118.

The email application 110 detects and recognizes that a video file has been transmitted with the electronic message 118 and therefore automatically presents a video icon 116 for viewing and controlling the attached video (step 228). Recipient may control the review of the electronic message 118 by selecting the appropriate control icon 116 to control the viewing. Reviewing of the electronic message includes but is not limited to: reading, declining to read the electronic message 118; saving the electronic message 118; or opening an attachment within the image 112 of the at least one contact, playing a video, stopping a video, fast-forwarding a video, rewinding a video, pausing a video, maximizing a video, minimizing a video, and cancelling the review of a video.

In some embodiments, the various communications mentioned above may be achieved through using a computer network, such as a local area network, or a wide area network, such as a world wide web. Accordingly, the various modules may be connected to each other directly or via a computer network.

Figure 3:
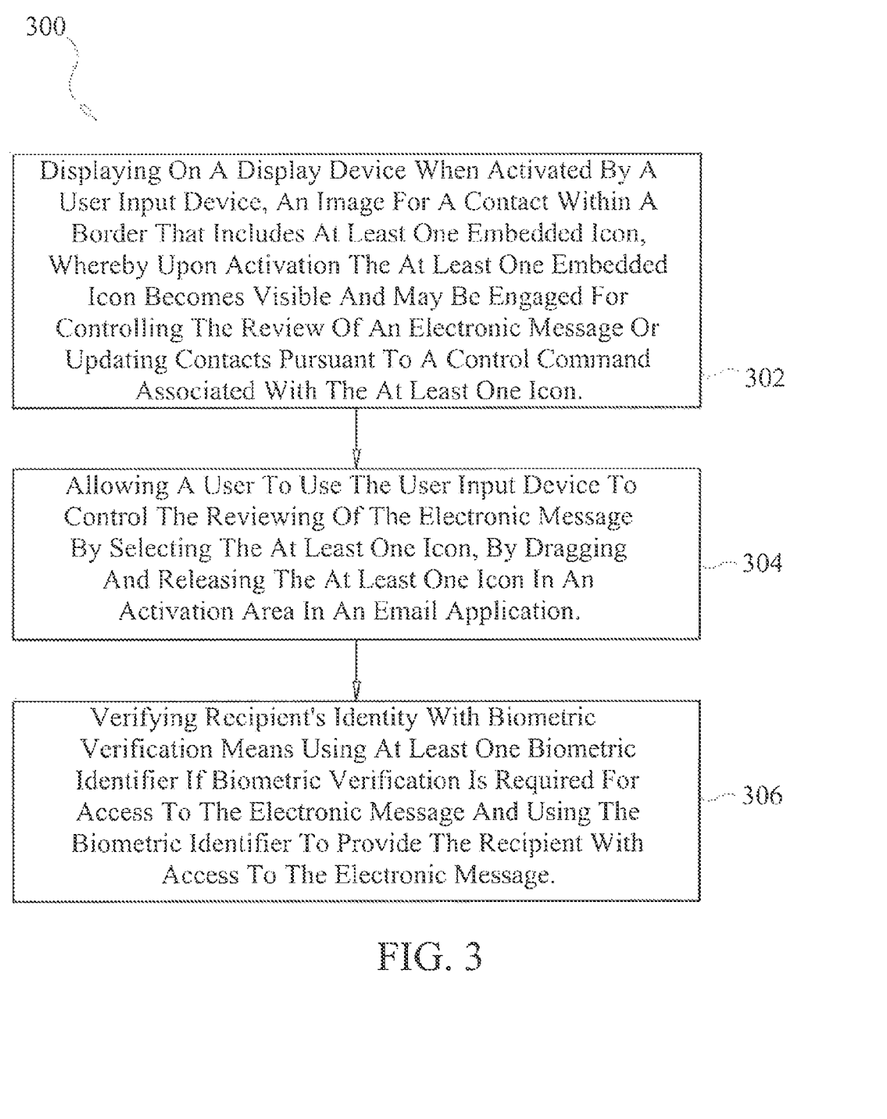
FIG. 3 shows a block diagram depicting a method in accordance with one embodiment.

FIG. 3 shows a block diagram depicting a computer implemented method 300 in accordance with one embodiment. Method 300 comprises displaying on a display device 104 when activated by a user input device 106, an image 112 for a contact, within a border 114 that includes at least one or more embedded icons 116, 116', whereby upon activation the at least one or more embedded icons 116, 116' become visible and may be engaged for controlling the review of an electronic message 118 or updating contacts pursuant to a control command associated with each at least one icon 118 (step 302). The email application automatically presents the appropriate icon 116 for display when activated, for a corresponding functional command for controlling the electronic message 118, based on any one or more of the following: attachment, no attachment, or type of attachment for the electronic message 118. The email application 110 recognizes that if there is no attachment, the icons 116, 116' for controlling the electronic message 118 will need to be adjusted so that the recipient will be able to either review the message or update his/her contacts. When the electronic message 118 includes an attachment, the email application 110 automatically determines whether it is s a document or a video file and will automatically present the appropriate icons for review and controlling the attachment (and/or type of attachment, i.e. video file).

Method 300 further comprises allowing a recipient to use the user input device 106 to control the reviewing of the electronic message 118 by selecting the at least one icon 116, by dragging and releasing the at least one icon 116 in an activation area 120 in the reviewing pane 132 of the email application 110 (step 304).

Method 300 further comprises verifying recipient's identity with biometric verification means 122 using at least one biometric identifier if biometric verification is required for access to the electronic message 118 and using the biometric identifier to provide the recipient with access to the electronic message 118 (step 306). In some embodiments, the user input device 106 includes biometric verification means 122 either as part of the user input device 106 or electronically connected to the user input device 106. In some embodiments, the biometric verification means 122 is a standalone device in electronic communication with the user device 128 or may comprise of software wherein the recipient may use the biometric verification means to provide his/her biometric sample for verification.

Method 300 further comprises the email application 110 being configured to apply an electronic postmark to the electronic message 118, wherein the electronic postmark comprises an identifier associated with a biometric identifier of the recipient. The identifier is configured to be used by an authorized recipient e-mail application 110 to verify the identity of the recipient and authorize access to the electronic message 118. In some embodiments, the biometric identifier triggers an authorized recipient e-mail application 110 to request a biometric identifier prior to granting access to the electronic message 118.

Hardware and Operating Environment

This section provides an overview of example hardware and the operating environments in conjunction with which embodiments of the inventive subject matter can be implemented.

A software program may be launched from a computer readable medium in a computer-based system to execute function defined in the software program. Various programming languages may be employed to create software programs designed to implement and perform the methods disclosed herein. The programs may be structured in an object-orientated format using an object-oriented language such as Java or C++. Alternatively the programs may be structured in a procedure-oriented format using a procedural language, such as assembly or C. The software components may communicate using a number of mechanisms, such as application program interfaces, or inter-process communication techniques, including remote procedure calls. The teachings of various embodiments are not limited to any particular programming language or environment. Thus, other embodiments may be realized, as discussed regarding FIG. 3 below.

Figure 4:
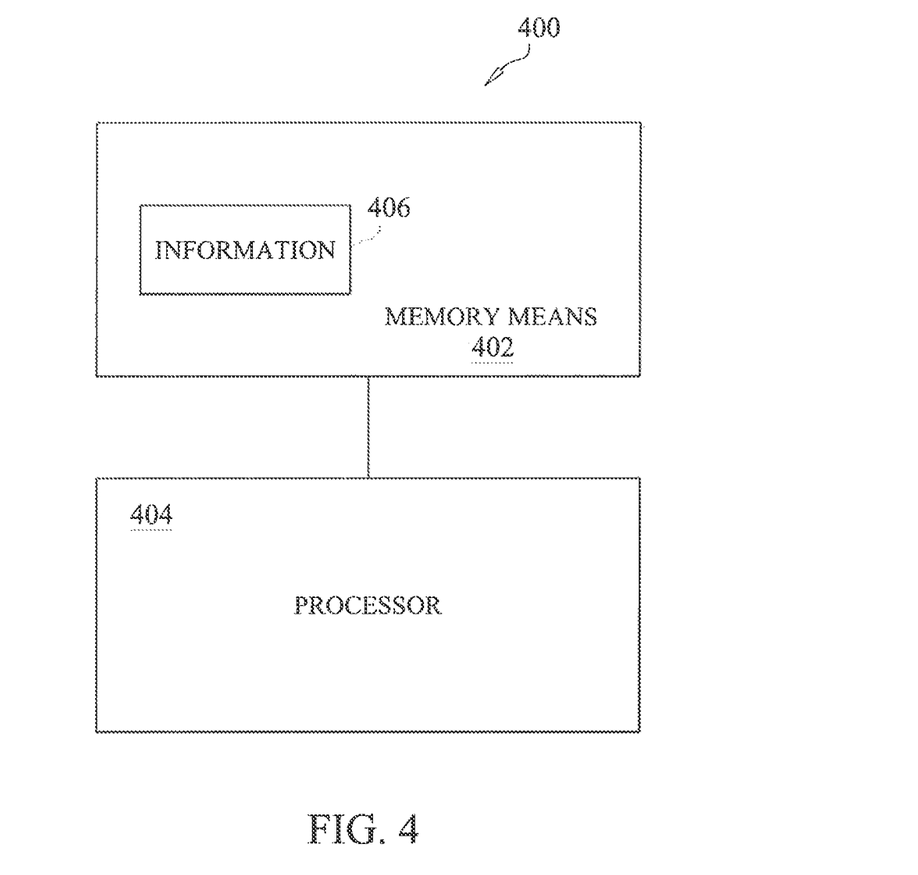
FIG. 4 is a block diagram representing an article according to various embodiments.

FIG. 4 is a block diagram representing an article 400 according to various embodiments. Such embodiments may comprise a computer, a memory system, a magnetic or optical disk, some other storage device, or any type of electronic device or system. The article 400 may include one or more processor(s) 402 couple to a machine-accessible medium such as a memory 404 (e.g., a memory including electrical, optical, or electromagnetic elements). The medium may contain associated information 406 (e.g., computer program instructions, data, or both) which, when accessed, results in a machine (e.g., the processor(s) 402) performing the activities previously described herein.

The principles of the present disclosure may be applied to all types of computers, systems, and the like, include desktop computers, servers, notebook computers, personal digital assistants, microcomputers, and the like. However, the present disclosure may not be limited to the personal computer.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best utilize the invention and various embodiments with various modifications as are suited to the particular use contemplated. Accordingly, while the principles of the disclosure have been described herein, it is to be understood by those skilled in the art that this description is made only by way of example and not as a limitation as to the scope of the disclosure. Other embodiments are contemplated within the scope of the present disclosure in addition to the exemplary embodiments shown and described herein. Modifications and substitutions by one of ordinary skill in the art are considered to be within the scope of the present disclosure.

What is claimed is:

1. A system comprising:
   a computer processor;
   a display device electronically connected to the computer processor;
   a user input device connected to the computer processor; and
   computer executable instructions executable by the computer processor and configured for causing the computer processor to launch an e-mail application programmed for revealing a contact's image surrounded by a border that includes at least one embedded icon prior to revealing any content for the e-mail;
      displaying when activated by the user input device the at least one embedded icon, whereby upon activation, the at least one embedded icon becomes visible within the border and is enabled for controlling the review of an electronic message or updating contacts pursuant to a control command associated with the at least one embedded icon;
      allowing a recipient to use the user input device to control the reviewing of the electronic message by selecting the at least one icon, by dragging and releasing the at least one icon in an activation area; and
   biometric verification means coupled to the computer processor and comprising at least one processor in communication with a biometric reader enabled for verifying the recipient's identity using at least one biometric identifier required for access to the electronic message and using the biometric identifier to provide the recipient with access to the electronic message.

2. The system of claim 1, wherein the computer executable instructions comprise a plug-in to a third party electronic mail application.

3. The system of claim 1, wherein updating contacts includes but is not limited to: to adding or declining to update contacts.

4. The system of claim 1, wherein reviewing of the electronic message includes but is not limited to: reading, declining to read the electronic message; saving the electronic message; or opening an attachment within the image of the at least one contact, playing a video, stopping a video, fast-forwarding a video, rewinding a video, pausing a video, maximizing a video, minimizing a video, and cancelling the review of a video.

5. The system of claim 1, wherein the e-mail application is configured to apply an electronic postmark to the electronic message, wherein the electronic postmark comprises an identifier associated with the biometric identifier of the recipient.

6. The system of claim 5, wherein the identifier is configured to be used by an authorized recipient e-mail application to verify the identity of the recipient and authorize access to the electronic message.

7. The system of claim 5, wherein the identifier triggers an authorized recipient e-mail application to request the biometric identifier.

8. The system of claim 1, wherein the biometric verification means includes but is not limited to any one or more of the following: fingerprint recognition means, hand geometry recognition means, palm geometry recognition means, iris recognition means, retina recognition means, speech recognition means.

9. The system of claim 1, wherein the embedded icon for display is determined based on any one or more of the following: attachment, no attachment, or type of attachment for the electronic message.

10. A computer implemented method comprising:
revealing a contact's image surrounded by a border that includes at least one embedded icon prior to revealing any content for the e-mail;
displaying on a display device when activated by a user input device the at least one embedded icon, whereby upon activation the at least one embedded icon becomes visible within the border and is enabled for controlling the review of an electronic message or updating contacts pursuant to a control command associated with the at least one embedded icon;
allowing a recipient to use the user input device to control the reviewing of the electronic message by selecting the at least one icon, by dragging and releasing the at least one icon in an activation area in an e-mail application; and
verifying the recipient's identity with biometric verification means comprising of at least one processor disposed in communication with a biometric reader, wherein the biometric verification means is enabled for using at least one biometric identifier required for access to the electronic message and using the biometric identifier to provide the recipient with access to the electronic message.

11. The method of claim 10, wherein the e-mail application comprises a plug-in to a third party electronic mail application.

12. The method of claim 10, wherein updating contacts includes but is not limited to: to adding or declining to update contacts.

13. The method of claim 10, wherein reviewing of the electronic message includes but is not limited to: reading, declining to read the electronic message; saving the electronic message; or opening an attachment within the image of the at least one contact, playing a video, stopping a video, fast-forwarding a video, rewinding a video, pausing a video, maximizing a video, minimizing a video, and cancelling the review of a video.

14. The method of claim 10, further comprising applying an electronic postmark to the electronic message, wherein the electronic postmark comprises an identifier associated with the biometric identifier of the recipient.

15. The method of claim 14, wherein the identifier is configured to be used by an authorized recipient e-mail application to verify the identity of the recipient and authorize access to the electronic message.

16. The method of claim 10, wherein the identifier triggers an authorized recipient e-mail application to request the biometric identifier.

17. The method of claim 10, wherein the biometric verification means includes but is not limited to any one or more of the following: fingerprint recognition means, hand geometry recognition means, palm geometry recognition means, iris recognition means, retina recognition means, speech recognition means.

18. The method of claim 10, wherein the embedded icon for display is determined based on any one or more of the following: attachment, no attachment, or type of attachment for the electronic message.

* * * * *